United States Patent
Salojärvi et al.

(10) Patent No.: US 11,572,257 B2
(45) Date of Patent: Feb. 7, 2023

(54) ESCALATOR

(71) Applicant: KONE Corporation, Helsinki (FI)

(72) Inventors: Jouni Salojärvi, Helsinki (FI); Tero Salin, Helsinki (FI); Aapo Saari, Helsinki (FI); Pirkka Haimi, Helsinki (FI); Pekka Hokkanen, Helsinki (FI); Visa Rauta, Helsinki (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 17/482,024

(22) Filed: Sep. 22, 2021

(65) Prior Publication Data
US 2022/0089413 A1    Mar. 24, 2022

(30) Foreign Application Priority Data

Sep. 23, 2020    (EP) .................................... 20197686

(51) Int. Cl.
*B66B 23/14*    (2006.01)
*B66B 23/00*    (2006.01)
*B65G 21/06*    (2006.01)

(52) U.S. Cl.
CPC .............. *B66B 23/14* (2013.01); *B66B 23/00* (2013.01); *B65G 21/06* (2013.01)

(58) Field of Classification Search
CPC ......... B66B 23/00; B66B 23/14; B65G 21/02; B65G 21/06
USPC ............................. 198/321, 326, 860.1, 860.5
See application file for complete search history.

(56) References Cited

U.S. PATENT DOCUMENTS

| | | | | |
|---|---|---|---|---|
| 6,685,002 B1 * | 2/2004 | Nurnberg | ................ | B66B 23/00 198/321 |
| 10,562,741 B2 * | 2/2020 | Eder | ....................... | B66B 21/00 |
| 2001/0025763 A1 | 10/2001 | Winkler | | |
| 2002/0175039 A1 * | 11/2002 | Fargo | ..................... | B66B 23/00 198/336 |
| 2014/0251768 A1 * | 9/2014 | Miles | ..................... | B65G 21/06 198/860.1 |
| 2016/0376128 A1 * | 12/2016 | González Pantiga | ... | B66B 23/00 198/321 |

FOREIGN PATENT DOCUMENTS

| | | | | |
|---|---|---|---|---|
| EP | 3109195 | * | 12/2016 | ............. B66B 23/00 |
| JP | 58-192867 U | | 12/1983 | |
| JP | 2909896 B1 | | 6/1999 | |
| JP | 2004-137014 A | | 5/2004 | |

OTHER PUBLICATIONS

European Search Report, issued in EP Application No. 20197686.7, dated Mar. 24, 2021.

* cited by examiner

*Primary Examiner* — James R Bidwell
(74) *Attorney, Agent, or Firm* — Birch, Stewart, Kolasch & Birch, LLP (57) ABSTRACT

An escalator includes a truss formed of a support structure that bridges a lower landing and an upper landing of the escalator. The truss includes two rising side sections extending upwards from a bottom plane of the truss, the side sections extending along a length of the truss and being joined together with cross braces. The escalator includes a subframe attached to an outer side of at least one side section of the truss, the subframe being arranged to receive an outer cladding of the escalator.

19 Claims, 12 Drawing Sheets

ESCALATOR

FIELD

The invention relates to an escalator.

BACKGROUND

An escalator is a type of vertical transportation in the form of a moving staircase i.e. a conveyor transport device for carrying people between floors of a building. The device consists of a motor-driven chain of individually linked steps that move up or down on tracks, allowing the step treads to remain horizontal. The steps move upwards and/or downwards on a transport side of the escalator and return back on a return side of the escalator.

An escalator may comprise landing platforms, a truss, tracks, steps and a balustrade.

The landing platforms house the curved sections of the tracks, as well as the gears and motors that drive the stairs. The top platform contains the motor assembly and the main drive gear, while the bottom platform holds the return cogwheel. These sections also anchor the ends of the escalator truss. In addition, the platforms contain a floor plate and a comb plate. The floor plate provides a place for the passengers to stand before they step onto the moving stairs. The floor plate is flush with the finished floor and is either hinged or removable to allow easy access to the machinery below. The comb plate is the piece between the stationary floor plate and the moving step. It is so named because its edge has a series of cleats that resemble the teeth of a comb. These teeth mesh with matching cleats on the edges of the steps. This design is necessary to minimize the gap between the stair and the landing, which helps prevent objects from getting caught in the gap.

The truss may be formed of a hollow metal structure that bridges the lower and upper landings. It may be composed of two side sections joined together with cross braces across the bottom and just below the top. The ends of the truss may be attached to the top and bottom landing platforms via steel or concrete supports. The truss carries all the straight track sections connecting the upper and lower sections.

The track system may be built into the truss to guide the steps and the chain, which continuously pulls the steps from the bottom platform and back to the top platform in an endless loop. The steps may be supported be two pairs of wheels on respective pairs of tracks. The axial distance between the wheels in two pairs of wheels and thereby also the axial distance between the two pairs of tracks may be different. The relative position of the two pairs of tracks cause the steps to form a staircase as they move out from under the comb plate. Along the inclined section of the truss, the tracks are at their maximum distance apart. This configuration keeps the step tread always horizontal on the escalator, whereby the steps resemble a staircase on the inclined section of the escalator. At the top and bottom of the escalator, the two tracks converge so that the two pairs of wheels are almost in a straight line. This causes the stairs to lay in a flat sheet like arrangement, one after another, so they can easily travel around the bend in the curved section of track. The tracks carry the steps down along the underside of the truss until they reach the bottom landing, where they pass through another curved section of track before exiting the bottom landing. At this point the tracks separate and the steps once again assume a staircase configuration. This cycle is repeated continually as the steps are pulled from bottom to top and back to the bottom again. The track system comprises transport guide rails on the transport side and return guide rails on the return side of the escalator.

The steps themselves are solid, one piece, die-cast aluminum or steel. In most escalator models, both the riser and the tread of each step is cleated i.e. given a ribbed appearance with comb like protrusions that mesh with the comb plates on the top and bottom platforms and the succeeding steps in the chain. The steps are linked by at least one continuous metal chain that forming a closed loop. The steps may be supported by two pairs of wheels. The wheels in one of the pairs of wheels are set further apart in an axial direction compared to the other pair of wheels.

A balustrade may be positioned at opposite lateral sides of the steps. The balustrade may comprise a base supported on the truss, a balustrade panel extending upwards from the base, and a moving handrail supported on an upper edge of the balustrade panel. The base of the balustrade may be covered with a skirt panel located adjacent to the steps and running parallel to the step travel. A gap is formed between the skirt panel and a vertical side surface of the steps. The handrail provides a convenient handhold for passengers while they are riding the escalator. The handrails are pulled along their track by a chain that may be connected to the main drive gear by a series of pulleys.

The truss is normally manufactured by a subcontractor. There may be small mistakes in the dimensions of the trusses and the trusses may not be quite straight in the longitudinal direction of the escalator. The installation of the motor, the driving mechanism and other equipment into the truss at the escalator factory may cause further distortion in the dimensions and the straightness of the truss. The installation of the escalator at the site might also cause further distortion in the dimensions and the straightness of the truss.

It is expensive and time consuming to try to repair the previously caused distortions and damages to the truss in each of the consecutive stages of the process.

JP S58 192867 U discloses an escalator provided with an exterior structure.

US 2001/0025763 discloses an escalator provided with underneath view paneling.

JP 2 909896 B1 discloses an escalator provided with a side exterior structure that can easily be attached to a truss in the escalator.

JP 2004 137014 A discloses an escalator provided with hook members on the truss and members in the side panels and the bottom panels for attaching to the hook members.

SUMMARY

An object of the present invention is to achieve an improved escalator.

The escalator according to the invention is defined in claim 1.

The escalator comprises a truss formed of a support structure that bridges a lower landing and an upper landing of the escalator, the truss comprising two upwards from a bottom plane of the truss rising side sections, the side sections extending along a length of the truss and being joined together with cross braces.

The escalator comprises further a subframe, the subframe being attached to an outer side of at least one side section of the truss, the subframe being arranged to receive an outer cladding of the escalator. The subframe is formed of beams arranged in a lattice structure.

The separate subframe to be attached to the side sections of the truss solves the problems relating to the small mistakes in the dimensions of the trusses and the non-straightness of the trusses.

The separate subframe forms a high-quality support structure for the outer cladding of the escalator. The use of the subframe results in a flawless and straight installation of the outer claddings. The use of the subframe will also result in a screwless visual appearance of the escalator.

The use of the subframe will also make it easy to change the cladding panels if needed. Worn out or damaged cladding panels may be easily changed at any time.

DRAWINGS

The invention will in the following be described in greater detail by to means of preferred embodiments with reference to the attached drawings, in which.

DETAILED DESCRIPTION

Figure 1:
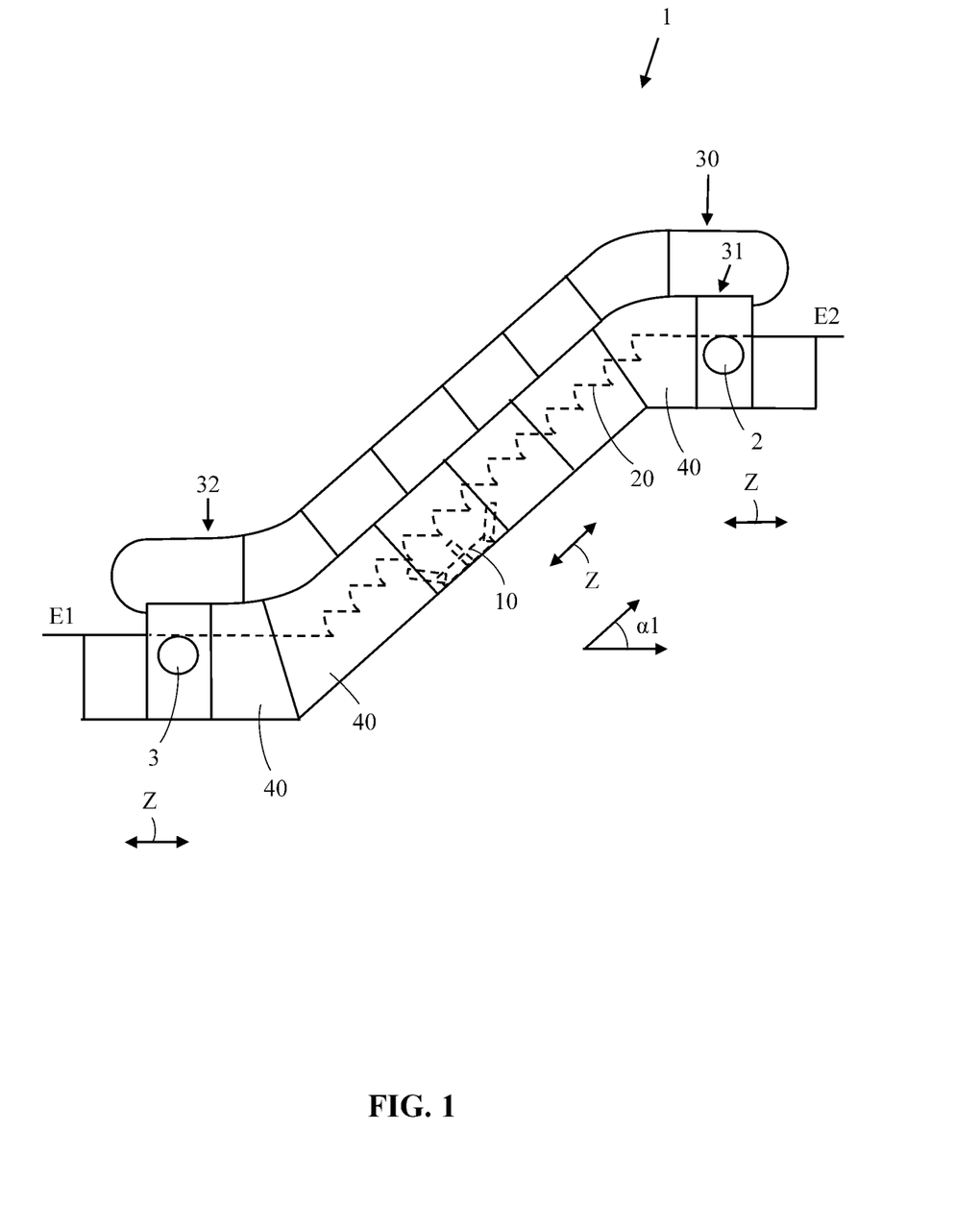
FIG. 1 shows a schematic side view of an escalator.

FIG. 1 shows a sematic side view of an escalator.

The escalator 1 connects a lower plane E1 with an upper plane E2. The truss 10 forms the load supporting framework of the escalator 1 between the upper plane E2 and the lower plane E1. The truss 10 is presented more in detail in FIG. 3. An endless formation of successive steps 20 moving in a closed loop around a driving roll 2 and a return roll 3 may be positioned in the truss 10. The driving roll 2 may be positioned at an upper end of the escalator and the return roll 3 may be positioned at a lower end of the escalator. The closed loop may thus be deflected in the upper plane E2 and in the lower plane E1. The balustrades 30 may extend along each longitudinal side of the step belt 20. A moving handrail 32 may be arranged at each balustrade 30, wherein the returning section of the handrail is arranged in a balustrade base 31 connecting the balustrade 30 with the truss 10. At least one side of the truss 10 may be clad with several cladding components 40. The cladding components 40 may extend in height above the truss 10 and the balustrade base 31 and may be made of steel plates. The balustrade 30 may comprise a support structure between the base 31 and the handrail 32. The support structure may be covered with cladding panels. The support structure may on the other hand be formed of balustrade panels extending between the base 31 and the handrail 32. The balustrade panels may be transparent, e.g. formed of glass.

The length direction Z of the escalator is also indicated in the figure. The length direction Z is horizontal on the lower plane E1 and on the upper plane E2 of the escalator. The length direction Z forms a first angle α1 with the horizontal plane on the inclined portion of the escalator.

Figure 2:
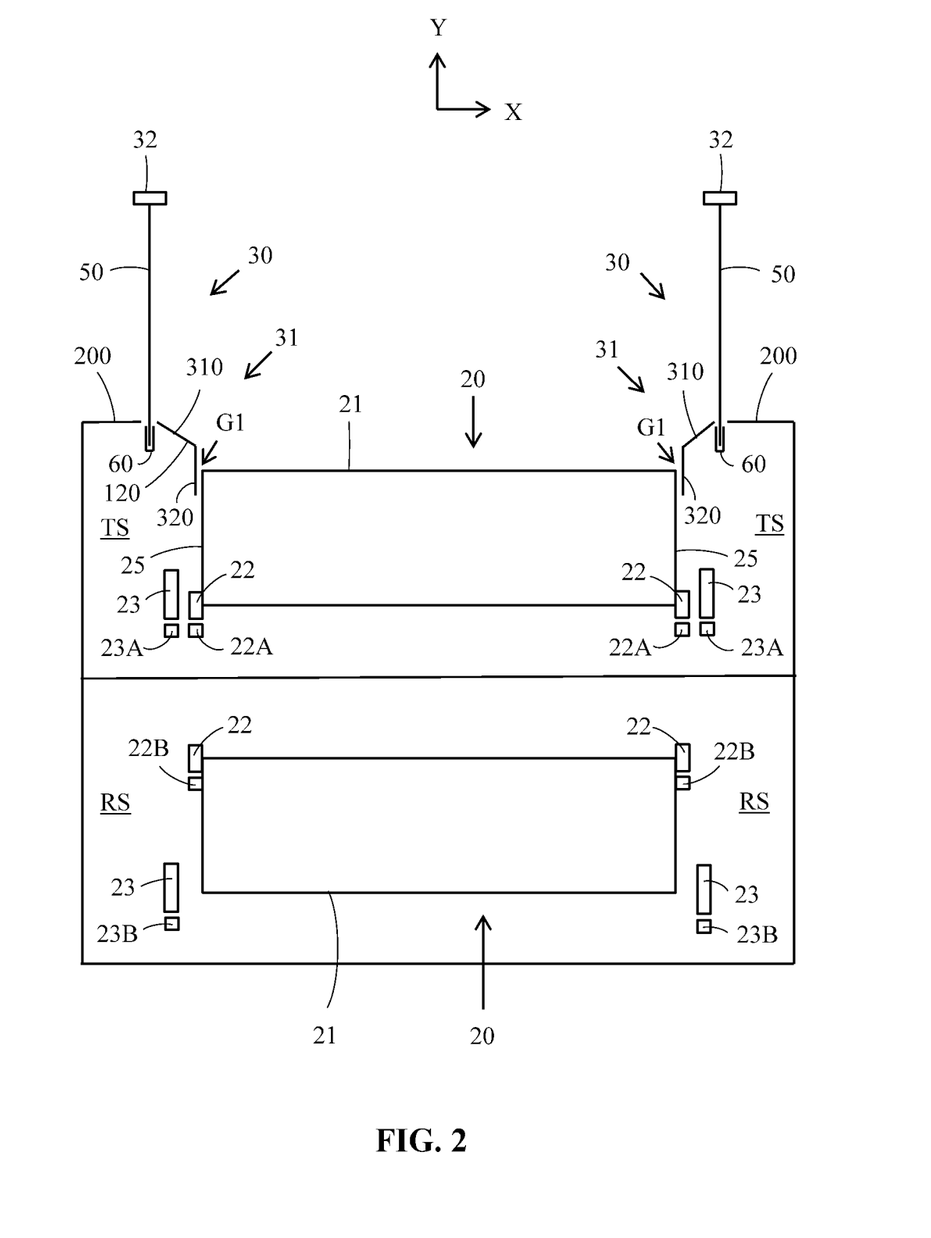
FIG. 2 shows a schematic vertical cross section of the escalator.

FIG. 2 shows a schematic vertical cross section of the escalator.

The transverse direction X i.e. the width direction of the steps 20 as well as the height direction Y i.e. the vertical direction is indicated in the figure. The escalator may have a transport side TS and a return side RS. The upper portion of the figure shows the steps 20 in the transport side TS of the escalator. The step tread 21 of the steps 20 is facing upwards in the transport side TS of the escalator. The lower portion of the figure shows the steps 20 in the return side RS of the escalator. The steps 20 are hanging i.e. with the step tread 21 facing downwards in the return side RS of the escalator. The steps 20 are transported back to the beginning of the transport side TS in the return side RS of the escalator. The steps 20 may move either upwards or downwards on the transport side of the escalator. People may thus be transported upwards and/or downwards in the transport side TS of the escalator. The escalator may be configured to operate only in one direction or the escalator may be configured to operate in both directions according to the need.

The escalator may comprise a horizontal top platform, a horizontal bottom platform and an inclined portion extending between the top platform and the bottom platform.

Each step 20 may be provided with two pairs of rollers. A first pair of rollers 22 may be provided on a first edge of the step 20. Each roller 22 in the first pair of rollers is provided on a respective side of the step 20. A second pair of rollers 23 may be provided on a second edge of the step 20. Each roller 23 in the second pair of rollers is provided on a respective side of the step 20. The axial distance between the rollers 22 in the first pair of rollers 22 may be smaller than the axial distance between the rollers 23 in the second pair of rollers 23. The rollers 22 in the first pair of rollers 22 and the rollers 23 in the second pair of rollers may be rotatably supported with a shaft on the support frame of the step 20. The first edge of the step 20 may be the edge of the step 20 that is facing towards the upper end of the escalator and the second edge of the step 20 may be the edge of the step 20 that is facing towards the bottom end of the escalator when the step 20 is moving upwards on the transport side TS of the escalator. The step 20 may move upwards or downwards on the transport side TS of the escalator.

The escalator may be provided with a first pair of transport guide rails 22A for the first pair of rollers 22 in the transport side TS of the escalator and with a second pair of transport guide rails 23A for the second pair of rollers 23 on the transport side TS of the escalator.

The escalator may further be provided with a first pair of return guide rails 22B for the first pair of rollers 22 in the return side RS of the escalator and with a second pair of return guide rails 23B for the second pair of rollers 23 on the return side RS of the escalator.

The first pair of rollers 22 and the second pair of rollers 23 run on an upper support surface of the respective transport guide rail 22A, 23A on the transport side TS of the escalator. The forces acting on the treads 21 of the steps 20 will thus be distributed through the rollers 22, 23 to the respective transport guide rails 22A, 23A.

The steps 20 are supported in a hanging position from the first pair of rollers 22 and the second pair of rollers 23 running on a respective return guide rail 22B, 23B on the return side RS of the escalator. The return guide rails 22B, 23B only have to support the weight of the steps 20.

The shaft of the first rollers 22 may be attached to a chain at only one axial side of the step or at both axial sides of the step 20. The chain at one side of the step 20 or the chains at each side of the step 20 may form an endless loop running over the driving roll on an upper level of the escalator and over the return roll on a lower level of the escalator. The chain may be provided with one or more chain wheels in the chain loops between the points in which the chain is attached to the rollers 22 of the step 20. The chain wheels may roll on the same guide rails 22A, 23A. The driving roll may be driven directly or through a transmission by an electric driving motor. The electric driving motor may be controlled by a converter. The rotation speed and direction of rotation of the electric driving motor may be controlled with the converter.

The transport guide rails 22A, 23A and the return guide rails 22B, 23B may be supported with support brackets at variable intervals to the truss 10 of the escalator. The transport guide rails 22A, 23A and the return guide rails 21B, 23B may be manufactured from cold rolled steel by roll-forming bending, drawing or some other suitable method for producing long, light-weight metal structures.

The balustrade 30 may be formed of a base 31, balustrade panels 50 supported on the base 31, and handrails 32 movably supported on the upper edge of the balustrade panels 50. The lower end of the balustrade panel 50 may be supported in a slit 60 arranged in the base 31 of the balustrade 30. The balustrade panel 50 may be formed of several successive balustrade panels 50 positioned end-to-end along the longitudinal direction of the escalator. The balustrade panels 50 may be transparent, e.g. formed of glass.

The base 31 of the balustrade 30 may be covered with an inner deck panel 310, a skirt panel 320 and an outer deck panel 200.

The skirt panel 320 may be positioned at a horizontal distance from a vertical side plane 25 of the step 20. The skirt panel 320 may be parallel with the vertical side plane 25 of the steps 20. The skirt panel 320 may be substantially vertical. A gap G1 may thus be formed between the skirt panel 320 and the vertical side plane 25 of the steps 20. Safety regulations determine the maxim horizontal width of this gap G1. The vertical side plane 25 of the steps 20 extends on the vertical side surface of the steps 25 in the longitudinal direction Z of the escalator. The lower end of the skirt panel 320 may be positioned at a vertical distance below the tread 21 of the steps 20 and the upper end of the skirt panel 320 may be positioned at a vertical distance above the tread 21 of the steps 20.

The inner deck panel 310 may be inclined extending from the upper end of the skirt panel 320 towards the balustrade panel 50. The upper end of the inner deck panel 310 may extend at a horizontal distance from the balustrade panel 50.

The balustrade 30 shown in the figure is a low deck balustrade. The base 31 of the balustrade is low and the balustrade panel 50 forms the support structure of the balustrade 30 supporting the handrail 32.

Figure 3:
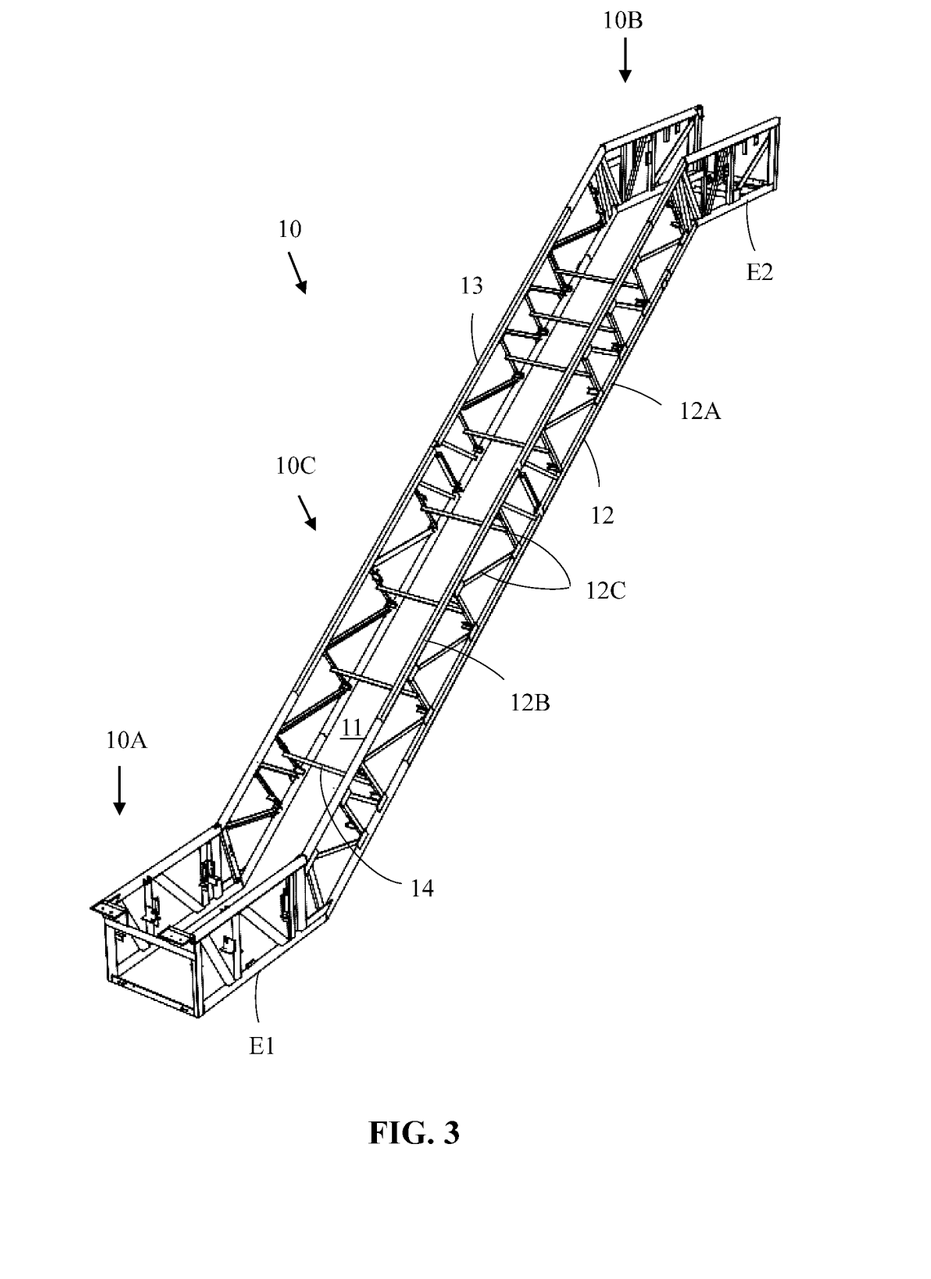
FIG. 3 shows a schematic isometric view of a truss of an escalator.
Figure 4:
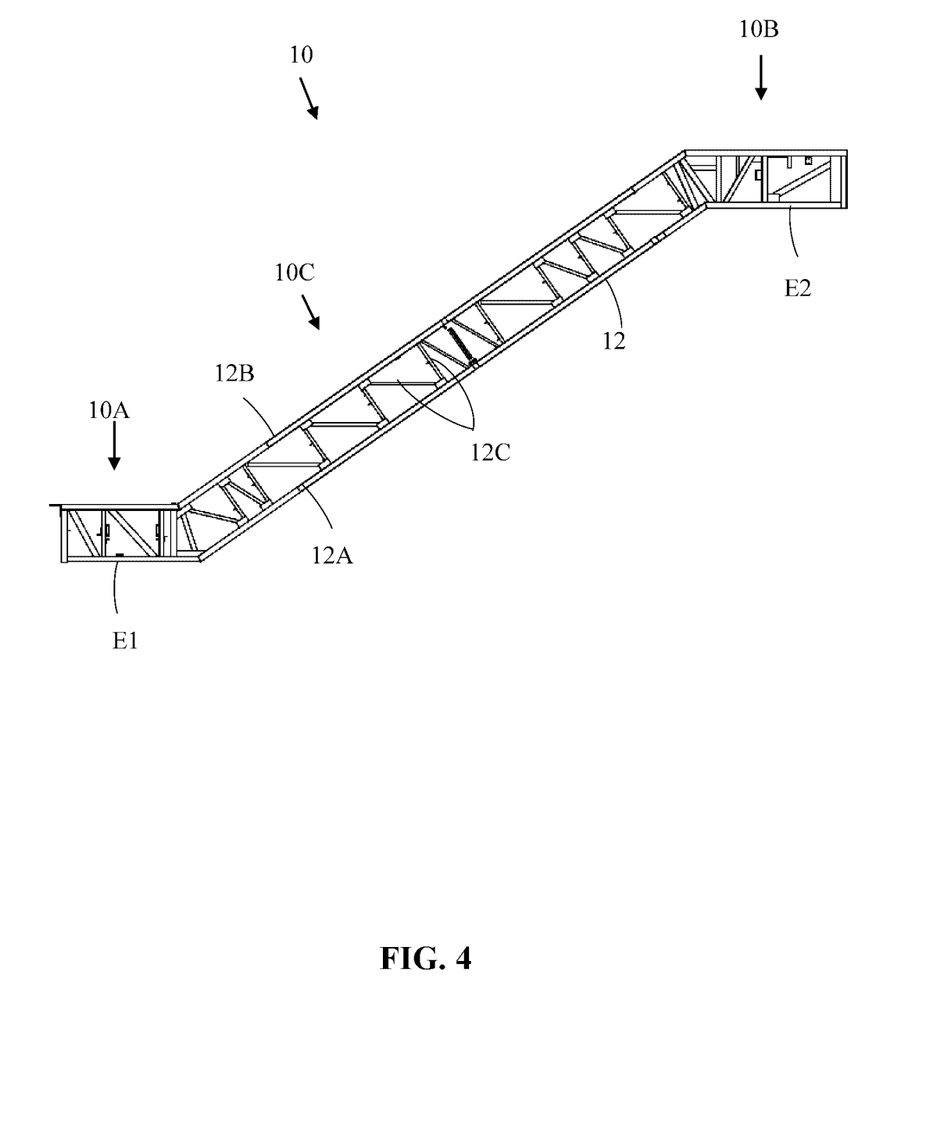
FIG. 4 shows a side view of the truss.

FIG. 3 shows a schematic isometric view of a truss of an escalator and FIG. 4 shows a side view of the truss.

The truss 10 may be formed of a support structure that bridges a lower landing E1 and an upper landing E2 of the escalator. The truss 10 may comprise a horizontal lower portion 10A, a horizontal upper portion 10B, and an inclined intermediate portion 100 extending between the lower portion 10A and the upper portion 10B. The truss 10 may comprise two upwards from a bottom plane 11 of the truss 10 rising side sections 12, 13. The side sections 12, 13 of the truss 10 may extend in a longitudinal direction Z of the truss 10. The side sections 12, 13 of the truss 10 may be joined together with cross braces 14.

The side sections 12, 13 of the truss 10 may be formed of a longitudinal lower support beam 12A, a longitudinal upper support beam 12B, and cross beams 12C extending between the lower support beam 12A and the upper support beam 12B.

Figure 5:
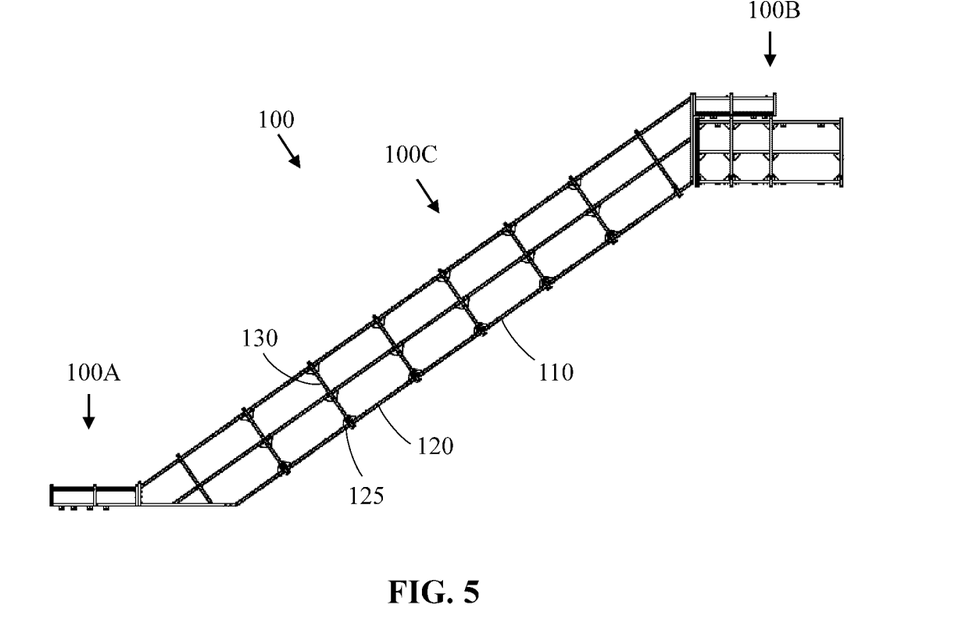
FIG. 5 shows a side view of a subframe of an escalator.

FIG. 5 shows a side view of a subframe of an escalator.

The subframe 100 may be formed of a separate part that is attached to the side section 12, 13 of the truss 10. The subframe 100 may be positioned on an outer surface of the side section 12, 13 of the truss 10. The attachment between the subframe 100 and the side section 12, 13 of the truss 10 may be adjustable. The position of the subframe 100 in relation to the side section 12, 13 of the truss 10 may thus be adjusted when the subframe 100 is attached to the side section 12, 13 of the truss 10. The adjustable subframe 100 makes it possible to achieve a straight, vertical, and a visually screwless appearance of the escalator after the cladding 40 has been attached to the subframe 100. There is thus no need to try to correct the possible flaws in the truss 10 by modifying the truss 10 as such. The possible flaws in the truss 100 will be corrected by adjusting the position of the subframe 100 on the truss 10. The subframe 100 may be attached to the truss 10 at the site of the escalator.

The subframe 100 may comprise a side portion 110 extending on the side of the side section 12, 13 of the truss 10. The side portion 110 of the subframe 100 may be formed of beams 120, 130 arranged in a lattice structure. The side section may comprise longitudinal beams 120 and transverse beams 130. The longitudinal beams 120 may extend in a longitudinal direction Z of the escalator. The transverse beams 130 may be perpendicular to the longitudinal beams 120. The longitudinal beams 120 may be attached to the transverse beams 130 with flanges 125 positioned in the intersections between the longitudinal beams 120 and the transverse beams 130. The subframe 100 may form a rigging grid between the truss 10 and the cladding panels 40.

The subframe 100 may be formed of modules. The subframe 100 may comprises three modules, a lower module 100A extending on the lower landing E1, an upper module 100B extending on the upper landing E2, and an intermediate module 100C extending between the lower module 100A and the upper module 100B. The lower module 100A may be positioned on the lower portion 10A of the truss 10. The upper module 100B may be positioned on the upper portion 10B of the truss 10. The intermediate module 100C may be positioned on the intermediate portion 100 of the truss 10. The lower module 100A and the upper module 100B may be substantially horizontal. The intermediate module 100C may be inclined. The intermediate module 100C may further be divided into submodules.

The beams 120, 130 in the subframe 100 may be dimensioned to support only the weight of the subframe 100, the cladding 40, and the soffit plates 400.

Figure 6:
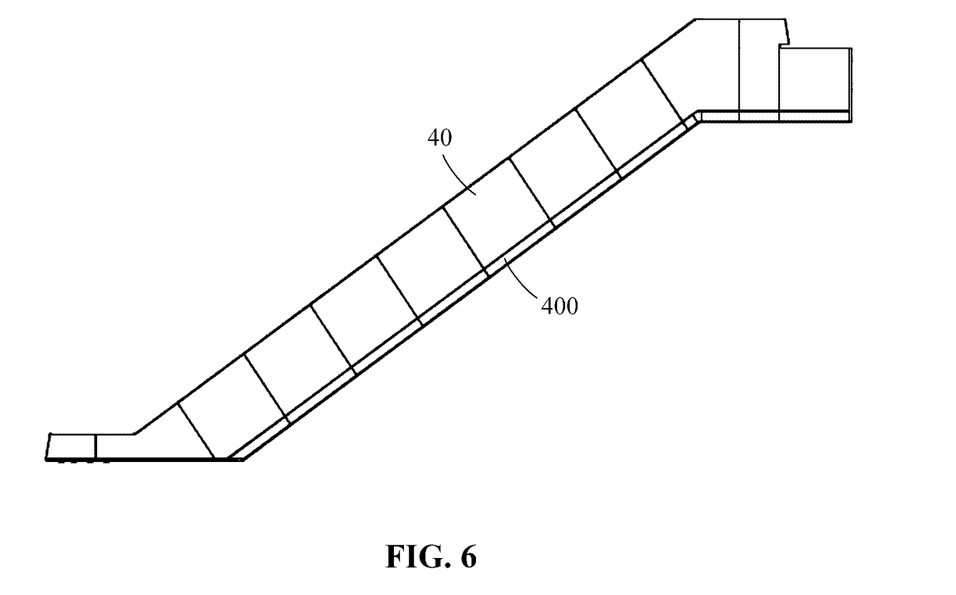
FIG. 6 shows a side view of an escalator with claddings.

FIG. 6 shows a side view of an escalator with claddings.

The cladding panels 40 at the side of the escalator and the soffit panels 400 at the lower corner of the escalator have been installed on to the outer surface of the subframe 100. The visual appearance of the escalator may be raised to a new higher level due to the use of the subframe 100.

Figure 7:
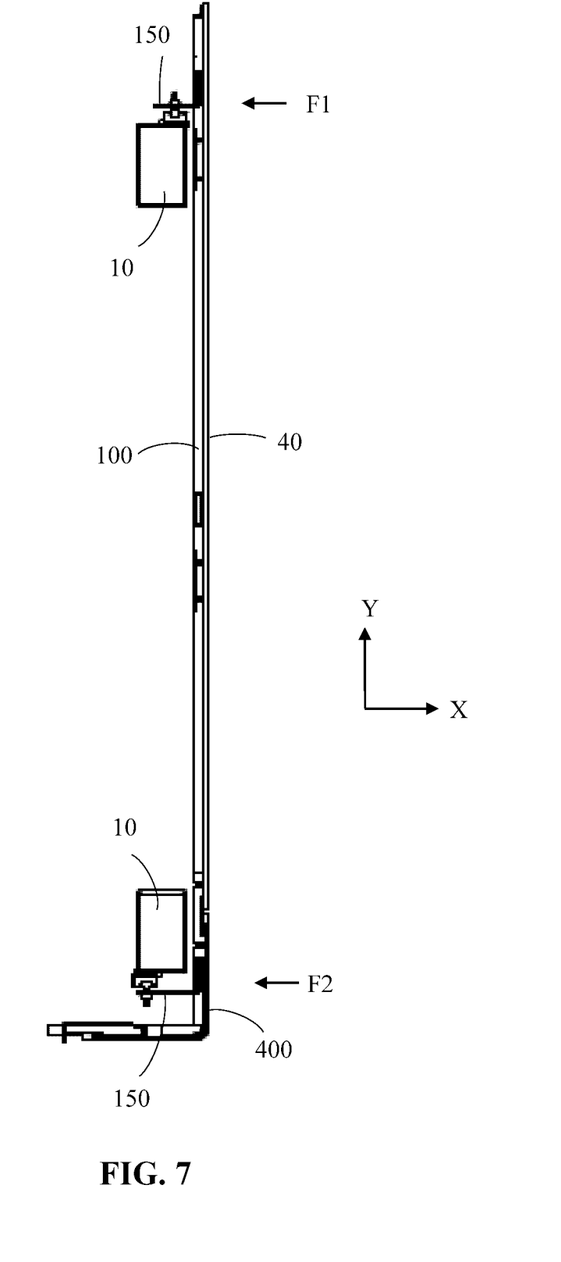
FIG. 7 shows a cross-sectional view of one side of the escalator.

FIG. 7 shows a cross-sectional view of one side of the escalator.

The subframe 100 may be attached to the truss 10 at first fastening arrangements F1 positioned in connection with an upper portion of the subframe 100 and second fastening arrangements F2 positioned in connection with a lower portion of the subframe 100. The first fastening arrangements F1 and the second fastening arrangements F2 may be arranged at suitable intervals along the longitudinal direction Z of the subframe 100. Each fastening arrangement F1, F2 may comprise a flange 150 being attached to the subframe 100. The flange 150 may extend outwards from the subframe 100 towards the truss 10. The flange 150 may extend substantially in the horizontal direction X. An inner end of the flanges 150 may be attached to the subframe 100. Suitable fastening means may be used to attach the flange 150 and thereby also the subframe 100 to the truss 10. The fastening means may be arranged such that the position of the subframe 100 in relation to the truss 10 may be adjusted. The cladding 40 and the soffit panels 400 may be attached to an outer surface of the subframe 100. The longitudinal direction Z of the subframe 100 extends into the paper in the figure.

Figure 8:
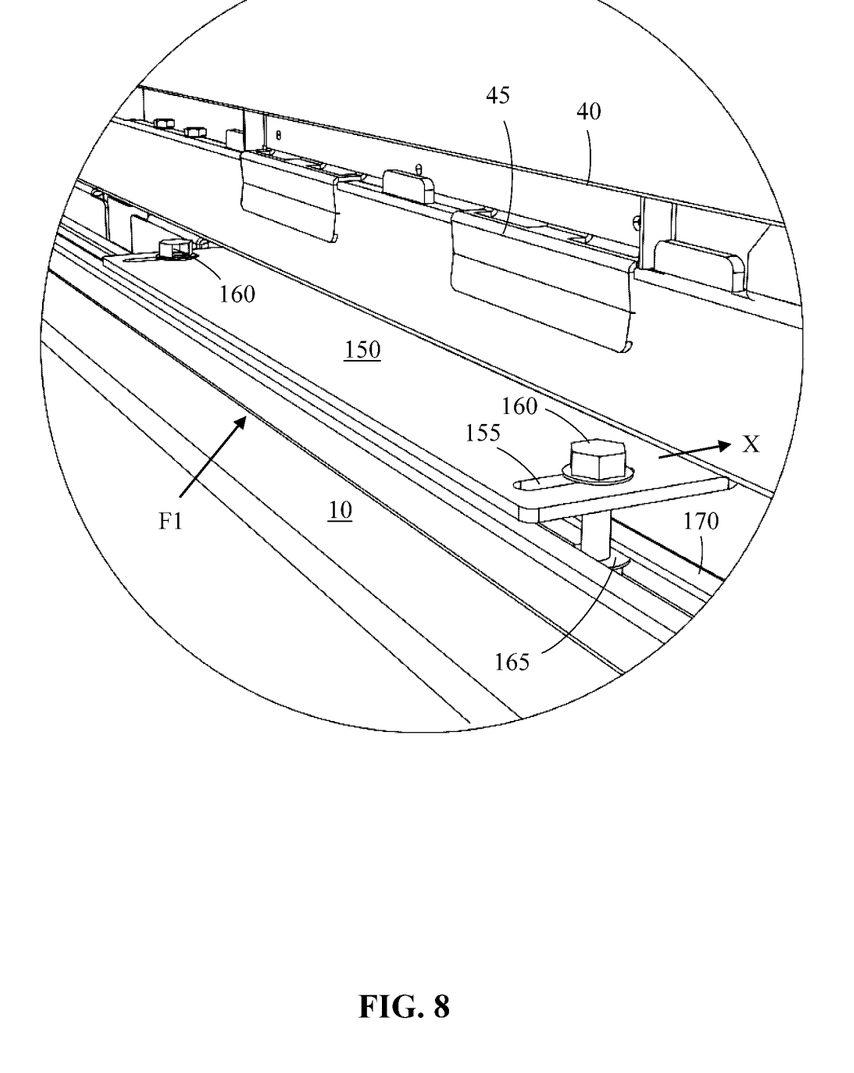
FIG. 8 shows an isometric view of an upper fastening of the subframe to the truss.

FIG. 8 shows an isometric view of an upper fastening of the subframe to the truss.

The subframe 100 may be attached via first fastening arrangements F1 to the truss 10. The first fastening arrangements F1 may be positioned in an upper portion of the subframe 100. The first fastening arrangements F1 may be distributed at certain intervals along the longitudinal direction Z of the subframe 100. A first C-profile 170 may be attached to an upper longitudinal support beam 12B in the truss 10. The first C-profile 170 may be attached to an upper surface of the upper longitudinal support beam 12B in the truss 10. The flange 150 may be provided with two openings 155. The openings 155 may be oblong in the horizontal direction X. The flange 150 may be attached with a bolt 160 passing through the opening 155 and a nut 165 to a first C-profile 170. The position of the subframe 100 in relation to the truss 10 may thus be adjusted.

The flange 150 becomes locked to the first C-profile 170 when the bolt 160 is tightened. The nut 165 may be formed of a house nut. The house nut may be positioned within the first C-profile 170. The house nut may have a rectangular head having a width and a length. The house nut may be positioned in the first C-profile 170 so that the length of the house nut extends along the slit in the first C-profile 170. Turning of the house nut by 90 degrees results in that the house nut becomes supported within the first C-profile 170. Tightening of the bolt 160 will now lock the flange 150 to the first C-profile 170.

The subframe 100 may thus be positioned on the outer side of the truss 10 so that the subframe 100 is vertical and straight in the longitudinal direction of the subframe 100 irrespective of possible flaws in the truss 10.

The cladding 40 may be attached with hook like fastening members 45 to the subframe 100.

Figure 9:
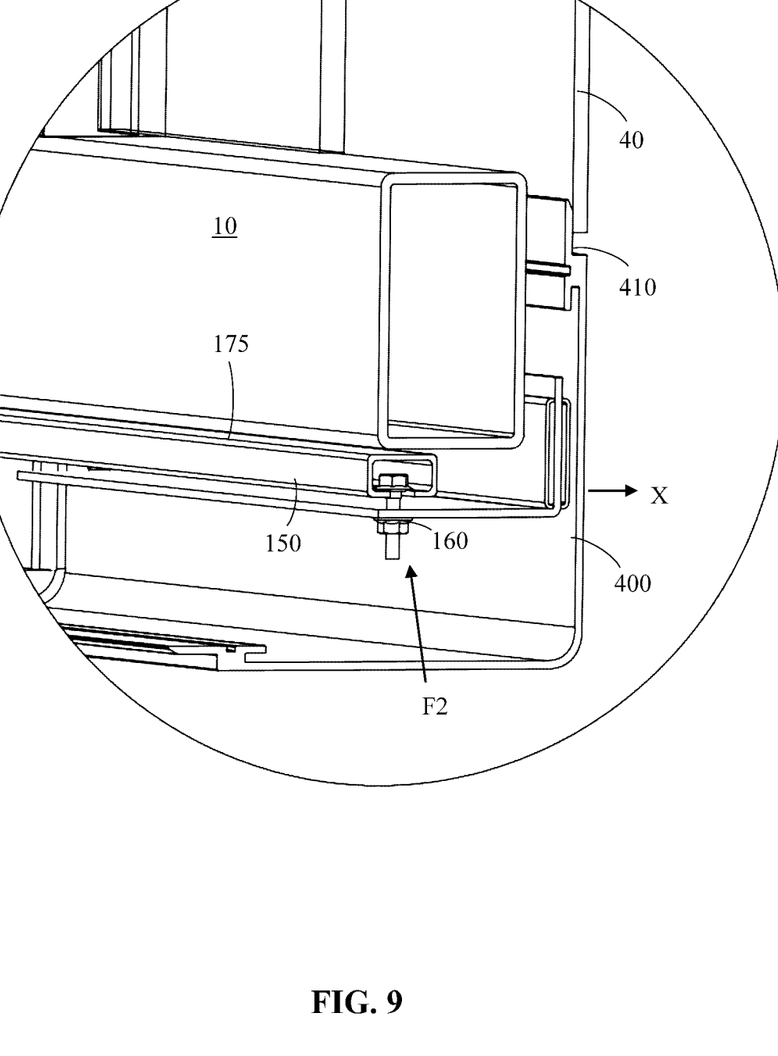
FIG. 9 shows an isometric view of a lower fastening of the subframe to the truss.

FIG. 9 shows an isometric view of a lower fastening of the subframe to the truss.

The subframe 100 may be attached via second fastening arrangements F2 to the subframe 100. The second fastening arrangements F2 may be positioned in a lower portion of the subframe 100. The second fastening arrangements F2 may be distributed at certain intervals along the longitudinal direction Z of the subframe 100. The flange 150 may be attached with two bolts 160 and nuts 165 to a second C-profile 175. The second C-profile 175 may be attached to a lower longitudinal support beam 12A of the truss 10. The second C-profile 175 may be attached to a lower surface of the lower longitudinal support beam 12A of the truss 10. The flange 150 may be provided with openings. The openings may be oblong in the horizontal direction X. The position of the subframe in relation to the truss 10 may thus be adjusted.

The flange 150 becomes locked to the second C-profile 175 when the bolt 160 is tightened. The head of the bolt 160 may be positioned within the second C-profile 175. The head may of the bolt 160 may comprise a rectangular portion having a width and a length. The head of the bolt 160 may be positioned in the second C-profile 175 so that the length of the head of the bolt 160 extends along the slit in the second C-profile 175. Turning of the head of the bolt 160 by 90 degrees results in that the head of the bolt 160 becomes supported within the second C-profile 175. Tightening of the bolt 160 will now lock the flange 150 to the second C-profile 175.

The subframe 100 may thus be positioned on the outer side of the truss 10 so that the subframe 100 is vertical and straight in the longitudinal direction of the subframe 100 irrespective of possible flaws in the truss 10.

The soffit plate 400 may be attached with fastening members to the subframe 100. The soffit plates 400 may form the starting point when a vertical row of cladding plates 40 is to be installed on the subframe 100. The soffit plate 400 may have the form of a letter L, wherein a first portion of the soffit plate 400 extends along the side of the subframe 100 and a second portion of the soffit plate 400 extends along the bottom of the truss 10. The lower edge of the cladding plate 40 may then be installed on a connection part 410 formed in the upper edge of the soffit plate 400.

Figure 10:
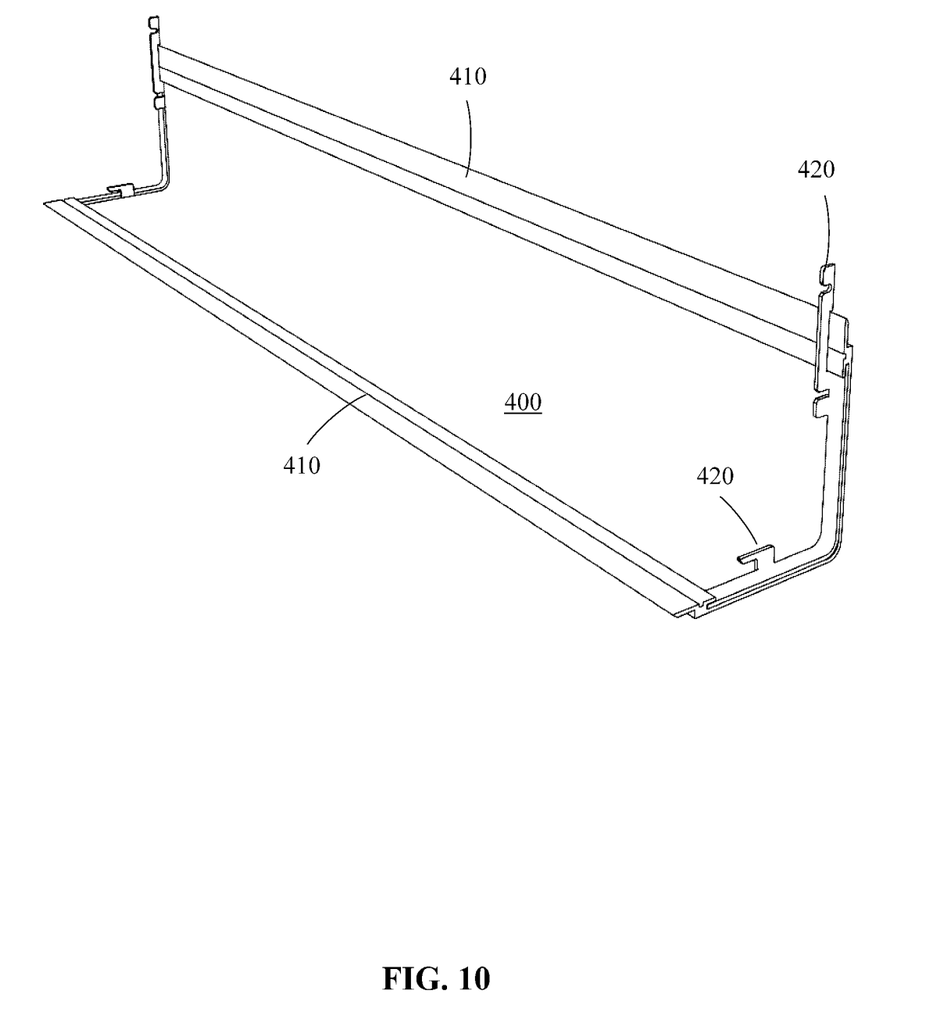
FIG. 10 shows an isometric view of a soffit panel of the escalator.

FIG. 10 shows an isometric view of a soffit panel of the escalator.

The soffit panel 400 may comprise a connection portion 410 at both outer ends of the L-shaped soffit panel 400. The soffit panel 400 may further comprise fastening members 420 for attaching the soffit panel 400 to the subframe 100. The fastening members 420 may have the shape of a hook.

Figure 11:
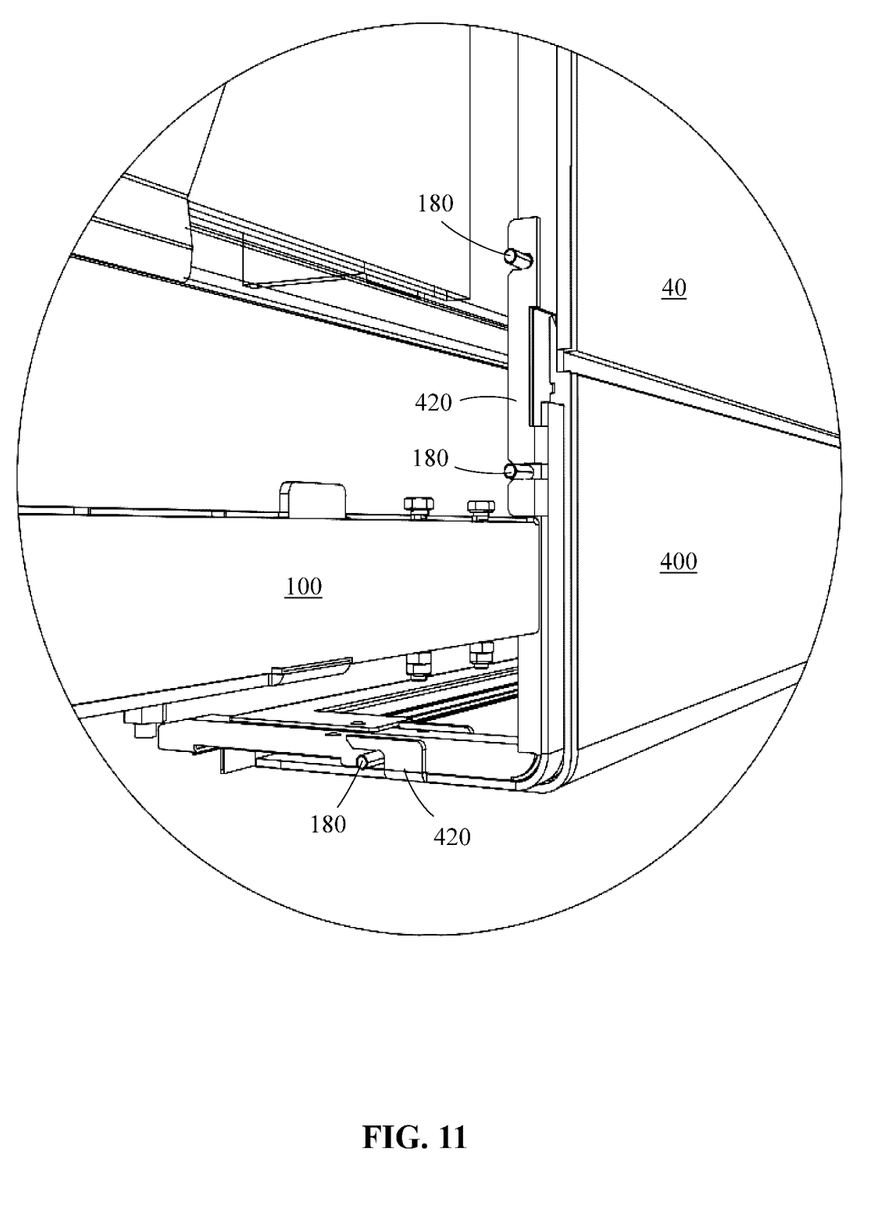
FIG. 11 shows an isometric view of the attachment of the soffit panel to the subframe.

FIG. 11 shows an isometric view of the attachment of the soffit panel to the subframe.

The soffit panel 400 may be attached with fastening members 420 having the shape of a hook to pins 180 attached to the subframe 100. The pins 180 may extend outwards from the subframe 100. The pins 180 may extend in a longitudinal direction of the subframe 100.

Figure 12:
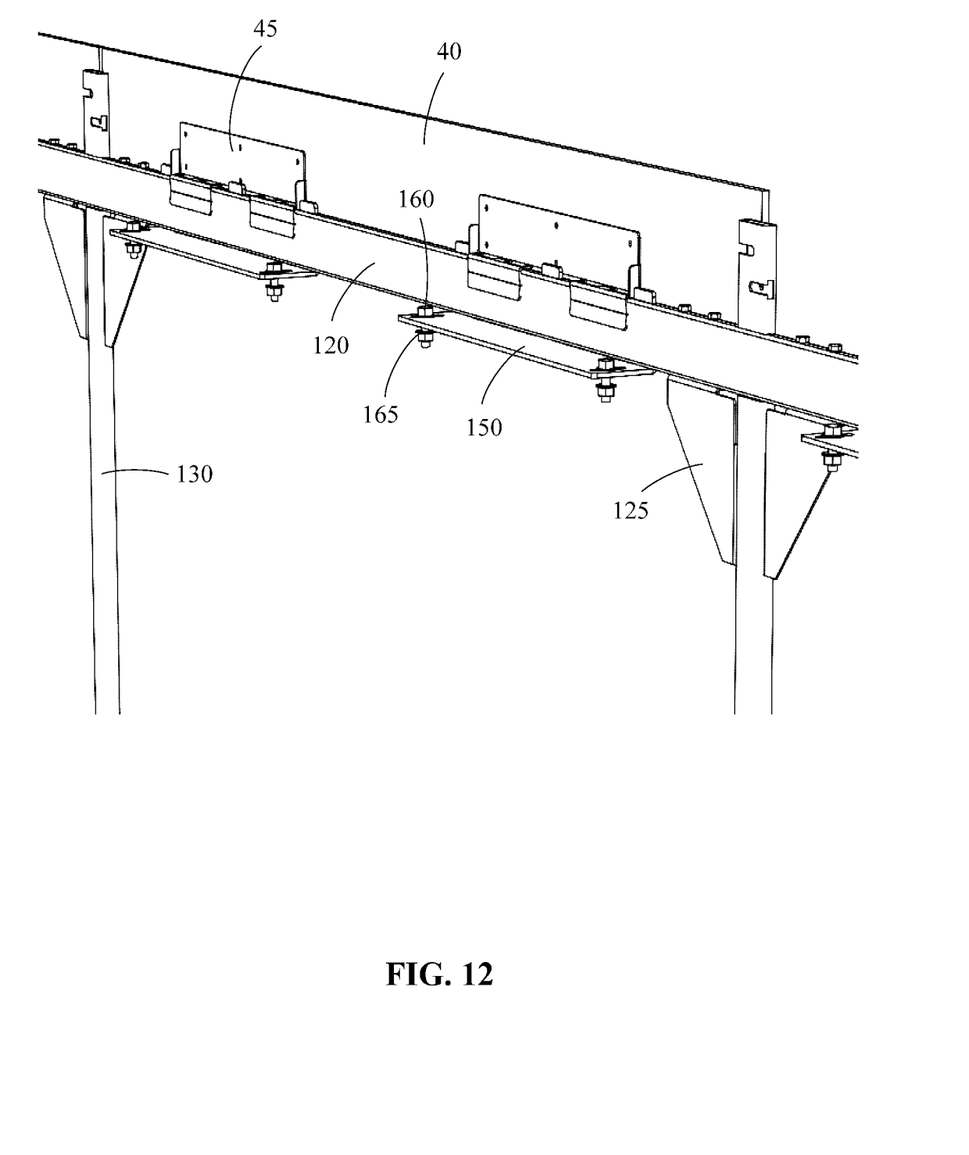
FIG. 12 shows an isometric view of the attachment of the cladding panels to the subframe.
Figure 13:
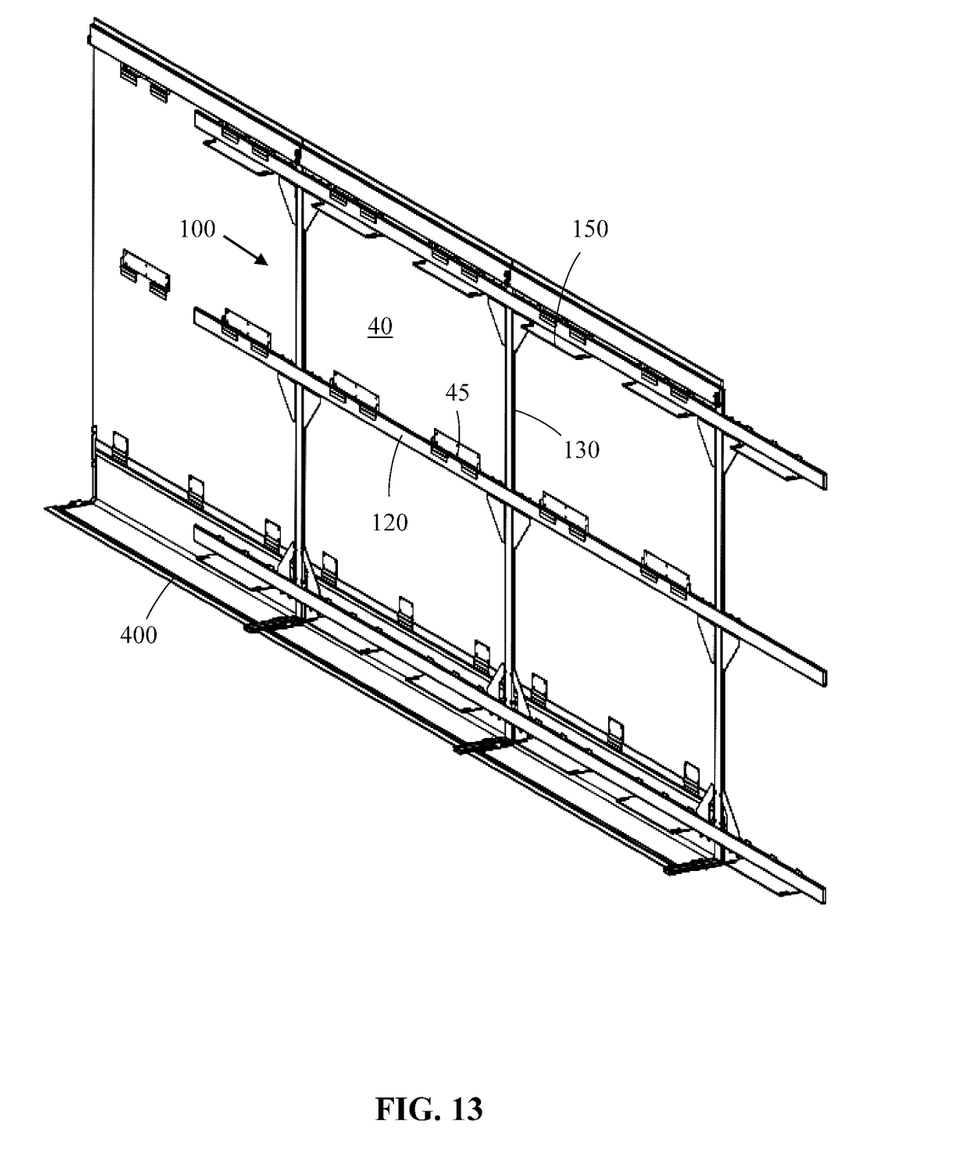
FIG. 13 shows an isometric view of the soffit panel and the cladding panels attached to the subframe.

FIG. 12 shows an isometric view of the attachment of the cladding panels to the subframe and FIG. 13 shows an isometric view of the soffit panel and the cladding panels attached to the subframe.

The cladding panels 40 may be attached to the longitudinal beams 120 of the subframe 100 with fastening members 45. The fastening members 45 may have the shape of a hook. The fastening members 45 may be attached to the cladding plates 40 in a suitable manner. The fastening members 45 may grip on the longitudinal beams 120 when the cladding panels 40 are lifted into place.

The flanges 125 attach the longitudinal beams 120 and the transverse beams 130 in the subframe 100 to each other.

The flanges 150 may be attached to the lower edge of the longitudinal beams 120 in the subframe 100.

The cladding panels 40 may be attached to the longitudinal beams 120 of the subframe 100 and the soffit panels 400 may be attached to pins 180 attached to the subframe 100.

The first C-profile 170 and the second C-profile 175 may be attached with any suitable attachment means to the truss 10. One possible fastening means is welding. The flanges 150 and the pins 180 may be attached with any suitable attachment means to the subframe 100. One possible fastening means is welding.

The figures shows two superimposed rows of cladding plates 40 on the subframe 100. This is an advantageous embodiment. The cladding may, however, be formed of any number of rows of cladding plates 40. The cladding plates 40 may naturally also form any pattern.

The use of the invention is not limited to the escalator disclosed in the figures. The invention can be used in any type of escalator.

It will be obvious to a person skilled in the art that, as the technology advances, the inventive concept can be implemented in various ways. The invention and its embodiments are not limited to the examples described above but may vary within the scope of the claims.

The invention claimed is:

1. An escalator comprising:
a truss formed of a support structure that bridges a lower landing and an upper landing of the escalator, the truss comprising two rising side sections spaced from one another in a first direction and extending upwards from a bottom plane of the truss, the side sections extending along a length of the truss and being joined together with cross braces; and
a subframe, the subframe being attached to an outer side of at least one of the two side sections of the truss and next to and spaced from the truss in the first direction, the subframe being arranged to receive an outer cladding of the escalator,
wherein the subframe is formed of beams arranged in a lattice structure.

2. The escalator as claimed in claim 1, wherein the subframe is adjustably attached to the truss.

3. The escalator as claimed in claim 2, wherein the beams in the subframe are dimensioned to support only the weight of the subframe and the cladding.

4. The escalator as claimed in claim 2, wherein the subframe is formed of modules.

5. The escalator as claimed in claim 2, wherein the outer cladding is attached to the subframe with fastening members having the shape of a hook.

6. The escalator as claimed in claim 1, wherein the beams in the subframe are dimensioned to support only the weight of the subframe and the cladding.

7. The escalator as claimed in claim 6, wherein the subframe is formed of modules.

8. The escalator as claimed in claim 1, wherein the subframe is formed of modules.

9. The escalator as claimed in claim 8, wherein the subframe comprises three modules, a lower module extending on the lower landing, an upper module extending on the upper landing, and an intermediate module extending between the lower module and the upper module.

10. The escalator as claimed in claim 9, wherein the intermediate module is further divided into submodules.

11. The escalator as claimed in claim 8, wherein the sides of the modules contact one another to connect the modules.

12. The escalator as claimed in claim 1, wherein the outer cladding is attached to the subframe with fastening members having the shape of a hook.

13. The escalator as claimed in claim 1, wherein the lattice has a top longitudinal beam, a bottom longitudinal beam and a plurality of transverse beams extending between the top longitudinal beam and bottom longitudinal beam.

14. The escalator as claimed in claim 1, wherein the lattice has an upper longitudinal support beam and a lower longitudinal support beam, and
wherein a height of the subframe is greater than a height of the truss.

15. The escalator as claimed in claim 1, further comprises a bracket connecting the subframe to the truss.

16. An escalator comprising:
a truss formed of a support structure that bridges a lower landing and an upper landing of the escalator, the truss comprising two rising side sections extending upwards from a bottom plane of the truss, the side sections extending along a length of the truss and being joined together with cross braces; and
a subframe, the subframe being attached to an outer side of at least one of the two side sections of the truss, the subframe being arranged to receive an outer cladding of the escalator,
wherein the subframe is formed of beams arranged in a lattice structure, and
wherein the subframe is attached to the truss at first fastening arrangements arranged at certain intervals along a longitudinal direction in an upper portion of the subframe and at second fastening arrangements arranged at certain intervals along the longitudinal direction in a lower portion of the subframe.

17. The escalator as claimed in claim 16, wherein each of the first fastening arrangements and each of the second fastening arrangements comprises a flange attached to the subframe, the flange extending outwards from the subframe towards the truss, the flange being adjustably attached with a fastener to the truss.

18. The escalator as claimed in claim 17, wherein the fastener comprises a bolt and a nut, the bolt passing through an opening in the flange to the truss, the nut securing the bolt to the truss, the opening being arranged to allow adjustment of the flange and thereby also the subframe in relation to the truss.

19. The escalator as claimed in claim 18, wherein the truss comprises a first C-beam attached to an upper longitudinal support beam in the truss and a second C-beam attached to a lower longitudinal support beam in the truss, the flange being attached with the bolt and the nut to the respective C-beam.

* * * * *